Patented Apr. 25, 1950

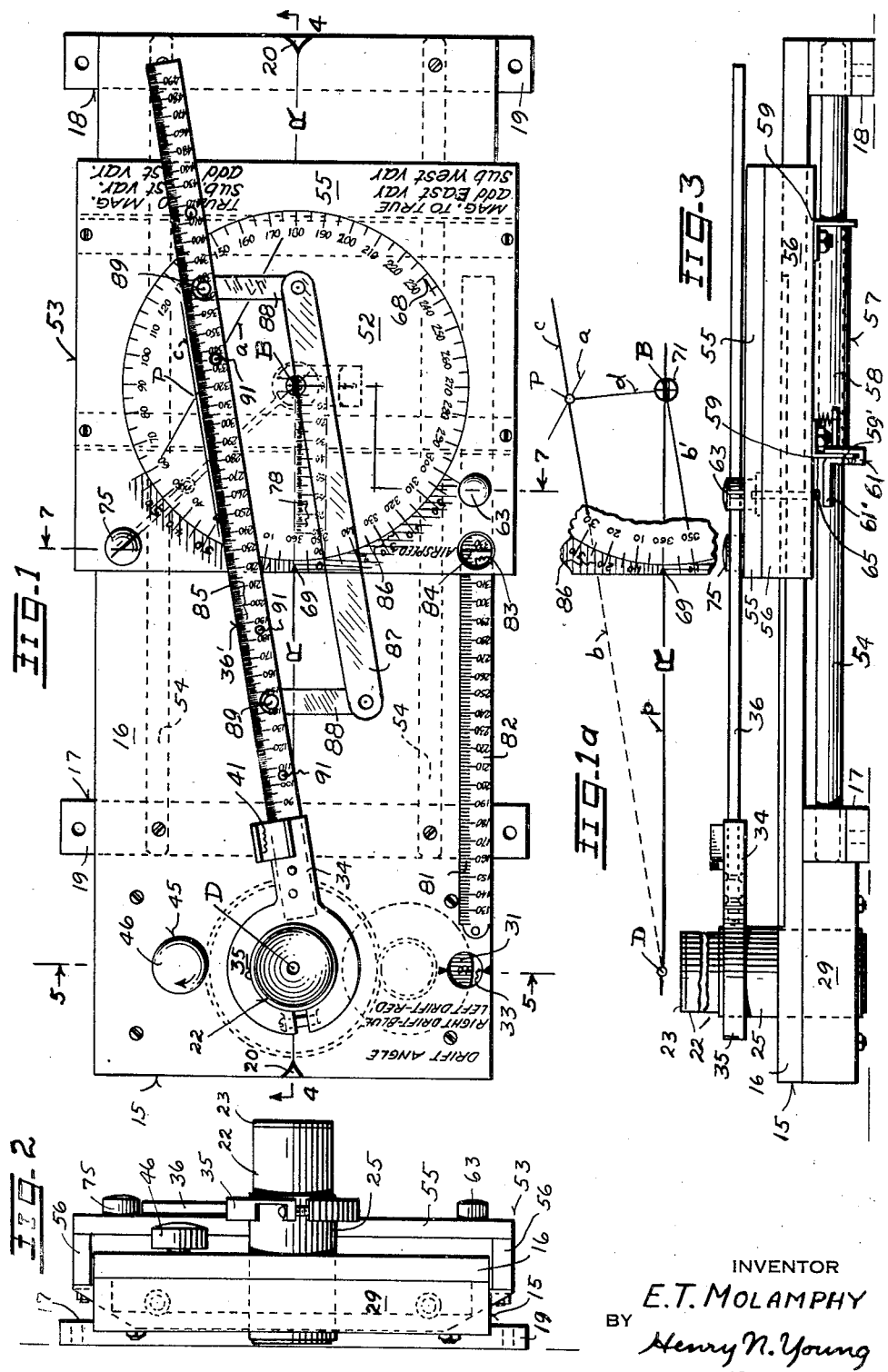

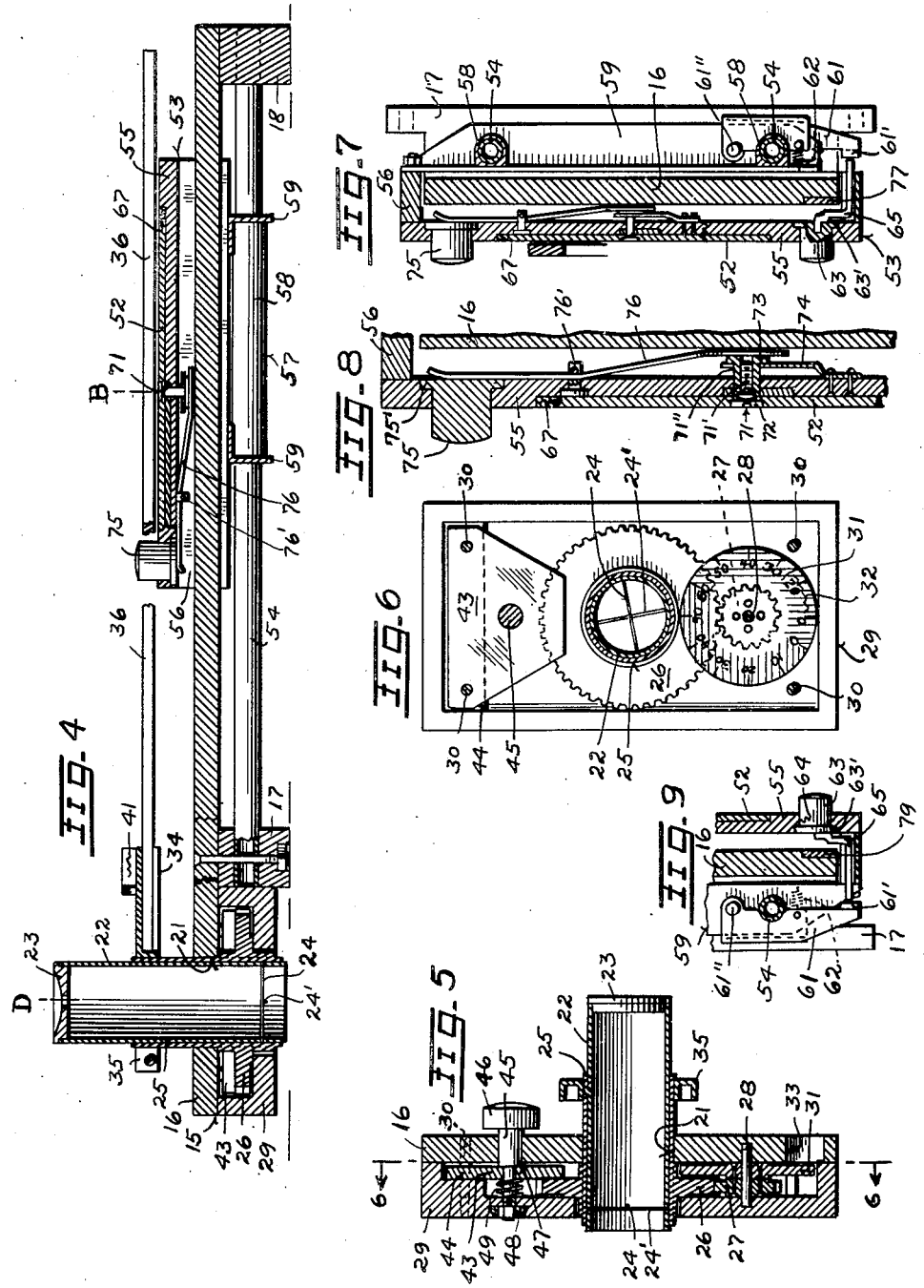

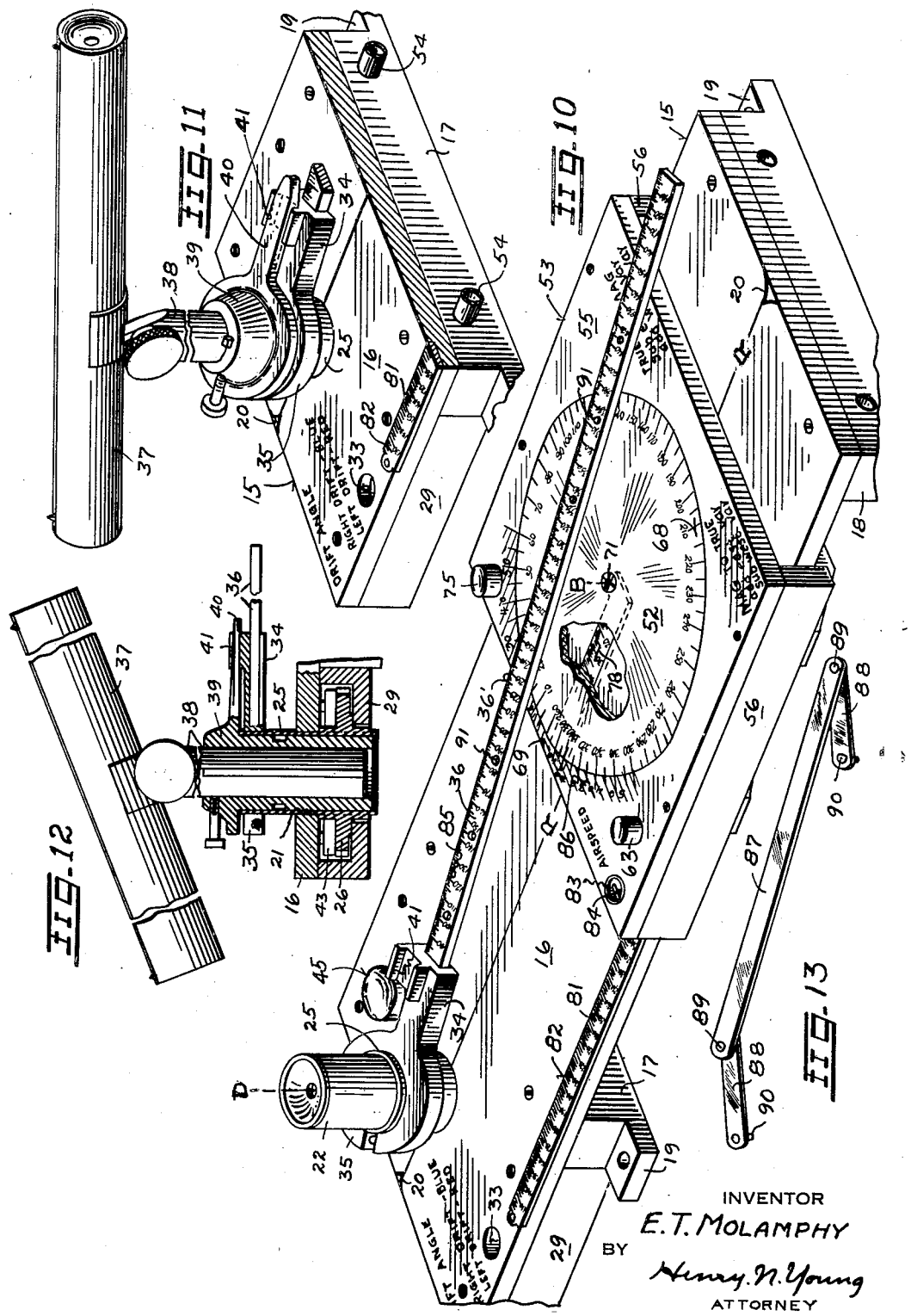

2,505,624

UNITED STATES PATENT OFFICE 2,505,624

NAVIGATION INSTRUMENT

Emmett T. Molamphy, Oakland, Calif.

Application August 1, 1945, Serial No. 608,151

3 Claims. (Cl. 235—61)

The invention relates to an aerial navigation instrument arranged for use in ascertaining various speed and bearing conditions relating to the dead-reckoning navigation of aircraft.

A general object of the invention is to provide a navigation instrument which mechanically and automatically solves vector triangles of the kind found in aerial navigation in a manner to provide direct readings for all solutions thereof.

A more specific object is to provide a navigation instrument of the class described which unitarily includes an improved means for measuring drift angles by direct observation.

Another object is to provide a navigation instrument by which navigation factors including ground speed and track bearing and wind velocity and wind bearing at a given point may be directly ascertained when solely the aircraft heading and airspeed are initially known.

A further object is to provide a navigation instrument having a protractor plotting disc and a plotting rule arranged for its operative setting over the disc in accordance with the drift angle of the aircraft.

An added object is to provide a navigation instrument in which right or left drift angles are automatically distinguished, and in which the application of magnetic variations to bearings is facilitated.

Yet another object is to provide a navigation instrument of the class described having its parts manufacturable interchangeably of various non-magnetic materials which are either metallic or non-metallic in accordance with the availability of the materials and without affecting the functioning or efficiency of the instrument.

The invention possesses other objects and features of advantage, some of which, with the foregoing, will be set forth or be apparent in the following description of typical embodiments thereof, and in the accompanying drawings, in which, Figure 1 is a plan view of a navigation instrument embodying the features of present invention and set for determinations therewith.

Figure 1a comprises a vector diagram which has been directly derived from the instrument as set in Figure 1.

Figure 2 is a forward end elevation of the instrument.

Figure 3 is a left-side elevation of the instrument.

Figure 4 is a longitudinal section at the line 4—4 in Figure 1.

Figure 5 is a lateral section at the line 5—5 in Figure 1.

Figure 6 is a sectional plan view at the line 6—6 in Figure 5.

Figure 7 is a lateral section at the broken line 7—7 in Figure 1.

Figures 8 and 9 are enlarged-scale views of portions of the showing of Figure 7.

Figure 10 is a perspective view of the instrument of Figures 1 to 9.

Figure 11 is a fragmentary perspective view of an alternative assembly using part of a conventional drift pelorus of the telescope type as part of the instrument.

Figure 12 is a fragmentary sectional view of the installation of the drift pelorus of Figure 11, the view being taken in a plane longitudinal of the instrument.

Figure 13 is a perspective view of a parallel rule attachment which is provided for use with the present assembly.

The navigation instrument of my invention essentially comprises a unitary assembly of devices carried on a common base 15 and cooperative in the manners hereinafter brought out to provide dead-reckoning and other navigational determinations. The base member 15 comprises a rectangular plate member 16 having spaced cleat-like foot members 17 and 18 fixed to its under side and extending laterally beyond the plate to provide ear portions 19 by which the base may be fixedly secured in a carrying vehicle, as an aircraft; as particularly shown, the ears 19 are provided with transverse perforations for the application therethrough of bolts or screws in the fixed mounting of the instrument at its place of installation. For a purpose which will hereinafter become evident, the member 17 is appreciably spaced from the forward end of the plate 16, while the member 18 is provided at the extreme rear end of the plate.

The upper face of the plate 16 is provided with positioning marks 20 at its extremities, the line 20—20 of said marks defining a longitudinal reference line R of the base; in the present instrument, said reference line coincides with the longitudinal center line of the plate top, though such is not essential. The present instrument is arranged to be installed in an aircraft or other vehicle, with the aforesaid reference line R parallel to (or perpendicular to) the fore-and-aft axis, or heading line, of the vehicle.

A circular opening 21 is provided transversely through the base plate 16 forwardly of the member 17 and having its axis intersecting and perpendicular to the reference line R. A sight tube 22 is rotatably mounted in the opening 21, said tube being provided with a pin-hole eyepiece 23 at its upper end and having mutually perpendicular cross-hairs 24 and 24' provided at its lower end and intersecting in the axis of its bore; the tube might be provided with lenses for functioning as a telescope with respect to an object viewed therethrough. The sight tube 22 is non-rotatably fixed in a sleeve 25 which is swivelled in the opening 21 for rotative adjustment about its longitudinal axis D while it is held against axial displacement and extends both above and below the plate 16, the sleeve thus providing a swivel mounting for the tube 22.

When a present instrument is installed for use in an aircraft, an unobstructed view must be provided for in the line of sight of the tube 22 to permit a viewing of underlying terrain or water as the case may be. By looking downwardly through the tube, an observer may note a fixed, or relatively fixed object defining a reference point, observe any apparent relative movement of said point with respect to a cross-hair 24 or 24' as the aircraft progresses, and adjustably rotate the tube, if necessary, to set a cross-hair parallel to the line of movement of the point across the field of vision of the tube; when a cross-hair is so set, its angular relation to the reference line R comprises the drift angle of the aircraft, and means are accordingly provided for accurately measuring such an angle, without necessitating the provision of an unduly large angle-measuring means.

As particularly shown, the sleeve 25 fixedly mounts a gear 26 at a point thereof below the plate 16, and said gear engages a pinion 27 mounted on a spindle 28 journalled in a suitable casing 29 enclosing the gear and pinion and fixed to and beneath the plate by means of screws 30. The spindle 28 mounts a disc 31 above the pinion 27 and immediately adjacent the overlying plate portion for the selective disposal of the calibrations 32 of an angle scale thereof opposite a sight opening 33 provided in the plate 16 laterally of the axis of the spindle. The gear casing 29 comprises a member which is rectangular in plan and is suitably recessed from above to receive the gear 26 and pinion 27 and disc 31 opposite the under face of the opposed plate portion, and the spindle 28 is journalled in and between aligned bearing sockets provided in the bottom of the casing and in the plate.

In the present structure, the diametrical pitch diameters of the gear 26 and the pinion 27 have a ratio of three to one, whereby a rotative adjustment of the sight tube is trebled at the disc 31 as a means to a more accurate reading of the drift angle at the opening 33, the upper disc face being calibrated accordingly. The different areas of the calibrated upper face of the disc 31 from the zero line thereof are differentiated for distinguishing right and left drift angle settings of the sight tube; said different areas may conveniently be of contrasting colors, as blue and red, respectively, for providing the desired differentiation.

It will now be noted that, with the reference line R of the instrument base extending longitudinally of the aircraft axis, the cross-hair 24 is arranged to be in parallel relation to said reference line when the drift angle is zero, a zero indication of the disc 31 being simultaneously presented at the sight opening 33. In this manner, a drift angle may be readily ascertained in direct accordance with a setting of the cross-hair 24 in the described manner. If the instrument should be mounted with the reference line R perpendicular to the longitudinal line of the aircraft, the cross-hair 24' would be used in positioning the sight tube 22 for ascertaining the drift angle.

At a point thereof above the plate 16, the sleeve 25 mounts a radial arm 34 for use in manners hereinafter brought out, it being noted that the disposal of the arm 34 is in direct accordance with an angle of drift for which the tube is set. In the present structure, the arm 34 extends integrally from a clamp ring 35 by which it may be fixed in appropriate rotatively adjusted position on the sight tube. A straight-edge rule member 36 extends from a radial socket in the arm 34 for swinging over the rearward portion of the plate as the sight tube 22 is rotatively adjusted, the line of the ruling edge 36' of the member 36 intersecting the sight tube axis in parallel relation to the cross-hair 24. The arm 34 and/or its rule extension 36 may be used by the operator for rotatively adjusting the tube during a direct drift observation, or be set in accordance with a drift angle otherwise ascertained.

In the embodiment of Figures 11 and 12, an arrangement is shown in which the sight tube 22 has been replaced by the sighting portion of a pelorus assembly comprising a telescope 37 adjustably hinged on a post 38 which extends from a sleeve member 39 providing a radial pointer arm 40, and has the post non-rotatably fixed within its bore. The sleeve 39 is fixedly engaged in the sleeve 25 for effecting a rotation of the latter with the post 38 for measuring drift angles as before, and said sleeves are held against relative rotation by reason of the complementary engagement of the pointer 40 on the sleeve 39 in a radial groove 41 provided on the top of the arm 34 for the specific purpose. The present arrangement provides for the use of the pelorus for determining a drift angle without need of looking downwardly in a direction generally perpendicular to the plane of the aircraft, while providing for a direct measurement of the drift angle and the simultaneous setting of the straight-edge rule 36 in a line which measures the drift angle with respect to the reference line R of the base 15. It will be noted that the complete navigation instrument associated with the present pelorus arrangement is otherwise the same for both embodiments.

Means are preferably provided for releasably fixing the sleeve 25 in a rotatively adjusted position following its setting in accordance with an ascertained drift angle. In the present structure, and as brought out in Figures 5 and 6, said means is operative against the gear 26, and comprises a clamp plate 43 for frictional engagement against the top of said gear. The clamp plate 43 extends between a top surface portion of the gear 26 and a seat 44 provided in the casing 29 and facing the under side of the base plate 16, and is provided with an intermediate transverse perforation for receiving a clamp screw 45 therethrough. The head 46 of the screw 45 is disposed above and clear of the upper face of the plate 16, and the shank of the screw is stepped to provide a downwardly-facing shoulder 47; the smaller screw shank portion closely and slidably engages the hole of the clamp plate 43 whereby the shoulder 47 is arranged to engage the top of the clamp plate.

The lower end portion of the screw 45 is threadedly engaged in the bottom of the casing 29; a nut 48 is particularly shown as fixedly mounted in the casing bottom for receiving the threaded screw end. An helical spring 49 encloses the lower screw portion between the clamp plate 43 and the casing bottom in axially compressed condition whereby it constantly urges an unseated relation of the plate with respect to the upper gear face. Two of the screws 30 which support the casing 29 from the plate 16 extend in sliding engagement through transverse holes of the member 43 at the seat 44, said screws functioning to position the member 43 in its operative position independently of the clamp-screw shank therethrough. When the sight tube 22 has been set in accordance with a drift determination, the screw 45 may be screwed down against the resistance of the spring 49 to clamp the gear 26 against rotation and so fix the rule 36 in drift-indicating position with respect to the reference line R.

It will now be noted that the rule 36 is arranged to be used in connection with a plotting disc 52 which is rotatably mounted on a support unit 53 which is in turn slidably mounted upon the base 15 for adjustment longitudinally along the base, the rotative axis B of the disc 52 intersecting the longitudinal reference line R of the base for all different adjusted positions of the unit 53. As particularly shown, the support unit 53 spans the base 15, is slidably supported for its adjustment over and along the base from mutually parallel support rods 54 engaged in and between the members 17 and 18 of the base, and comprises a top plate member 55 and side members 56 fixed beneath the ends of the plate 55 and freely receiving the base plate 16 between them, and a bracket assembly 57 fixed to and between the members 56 and providing tubular elements 58 which slidably receive the support rods 54 for the support of the unit 53 on the rods. The present bracket assembly 57 comprises angle members 59 extending between the side members 56 and having corresponding flanges thereof fixed to said sides, the other flanges of the members 59 carrying the tubular elements 58 through and between them.

Means are preferably provided for releasably securing the unit 53 in fixed adjusted position on the base plate 15, said means, in the present instance, being directly reactive between the unit and the support rods 54. By particular reference to Figures 3 and 7 and 9, it will be noted that one support rod 54 is normally engaged transversely thereof by a member 61 carried by the depending flange 59' of a bracket member 59. The member 61 is of channel section receiving the flange 59' between its sides, has one end portion 61' underlying a side 56 of the unit 53, extends to the opposite side of the adjacent rod 54 from its end 61', and is hingedly pivoted at its inner end to the enclosed flange 59' by a pivot pin 61''. The sides of the clamp member 61 are provided with notches opposite the rod 54, and a tension spring 62 is constantly operative between the member and the overlying flange of the member 59 for urging the member against the rod at the notches; the arrangement is understood to provide a friction grip of the engaged rod thereat.

A rod-releasing displacement of the member 61 is arranged to be effected by and upon a depression of a push-button 63 extending through and upwardly from an opening 64 in the top plate 55 of the unit adjacent a side edge of the latter. A push rod 65 extends rigidly from the button 63 to a contact with the outer end 61' of the clamp member 61; the rod 65 has an off-set structure whereby it may extend opposite and laterally clear of the base plate 15, the adjacent side member 56 of the support unit 53 being appropriately slotted from its inner face to guidedly engage the push rod 65 thereat. A flange 63' is provided at the lower end of the push-button 63 for engagement as a stop with the bottom of the plate 55 for limiting the extension of the button under the influence of the spring 62. For releasing the unit 53 for its adjustment along the base, it is merely necessary to slightly depress the button 63 during an adjustment of the unit.

In the present unit 53, the plotting disc 52 is complementarily engaged in a depression 67 in the top of the plate 55 for its free and centered rotation therein about its axis B, said disc being of transparent material and having its upper surface provided with a ground or matte finish whereby it is arranged for the drawing of erasable pencil lines upon it. The disc 52 has its top face flush with the top face of the plate 55, and is provided with protractor calibrations 68 around its rim for angle-measuring reference with respect to a "true-point" index mark 69 provided on the plate 55 at the end thereof toward the sight tube installation and directly above the reference line R; the disc 52 thus comprises a compass rose.

A releasable means is provided for normally securing the disc 52 in rotatively adjusted position on the plate 55, said means conveniently having a push-button release. As is particularly brought out in Figures 7 and 8, a pin member 71 extends freely through the plate 55 and disc 52 axially of the latter, said pin having flange-like upper and lower heads 72 and 73 at its extremities, and said pin heads being axially spaced by a distance which somewhat exceeds the combined thicknesses of the disc 52 and plate 55. A leaf spring 74 fixed to and beneath the plate 55 at a point laterally of the pin 71 has its free end forked to receive the shank of the pin 71 therethrough, said spring end engaging the top of the lower pin head 73 to constantly urge a seating of the upper pin head against the disc for normally securing the disc against rotation. As is particularly brought out in Fig. 8, the pin 71 comprises threadedly engaged screw and sleeve sections 71' and 71'' providing the heads 72 and 73 respectively.

Release of the disc 52 from its normal rotation-preventing frictional engagement with the plate 55 is arranged to be effected by and upon the depression of a push-button 75 extending through and upwardly from the plate at a point thereof peripherally beyond the disc. As particularly shown, the bottom end of the push-button 75 is engaged by one end of a lever 76 having its other end engaged beneath the lower pin head 73, said lever being intermediately pivoted to the plate 55 at a pivot pin 76' suitably mounted on and beneath the plate. The normal action of the spring 74 is such that the push-button 75 is secured in a raised position thereof in which a bottom flange 75' of the button engages the plate bottom to limit the upward extension of the button while preventing a contact of the other lever end with the underlying base plate 15; the relation is brought out in Figure 8. It will be understood that a slight depression of the button 75 releases the disc 52 for its rotative adjustment.

A wind-velocity scale is provided in association with the plotting disc 52, such a scale 78 being shown as provided along the reference line R of the instrument and extending between the disc axis B and the index point 69. In the present structure, the scale 78 is provided on an element 79 comprising a calibrated strip which is countersunk in the bottom of the disc-receiving socket of the plate 55, whereby the scale calibrations are arranged to be read through the transparent plotting disc 52 in the socket.

Means are provided for use in setting the unit 63, which provides the plotting disc 52 and the scale 78, in an adjusted position along the plate 16 corresponding to the air speed of the aircraft when the instrument is to be used. As particularly illustrated, an air-speed scale 81 extends along one side of the base plate 16 in parallel relation to the reference line R, the calibrations of said scale designating velocities in miles per hour and having their values increasing in a direction away from the swinging-adjustment axis D for the rule 36, the arrangement being such that air-speed settings of the unit 53 are measured from said axis which coincides with the axis of the sight tube.

The scale 81 is shown as provided on a straight strip 82 which is counter-sunk in the upper face of the base plate, and this scale is arranged for viewing through a sight opening 83 provided above its line in the plate 55, a cross-wire 84 in said opening being utilized for setting the disc axis B of the unit in accordance with the air speed of the aircraft. The rule 36 which extends from the arm 34 is provided with a velocity scale 85 along its length and increasing in values from its zero point which lies in the swinging-adjustment axis D of the arm, said calibrations being utilized in a determination of ground speed with the present instrument.

In general terms, the calibrations of the velocity scales 78 and 81 and 85 are appropriately correlated for mutual consistency of reference to each other and to the compass rose of the plotting disc 52; in the present structure, the velocity graduations are of like measure for the different said scales. Noting that the wind drift angle will seldom exceed forty-five degrees, and recalling that the drift angle varies inversely with the air speed of an aircraft, the compass rose disc 52 need be no longer than is necessary for the use of a wind velocity scale 78 of maximum required range, whereby the present instrument is particularly compact without sacrificing accuracy of determinations; the present disc is usable for wind velocities of up to 90 miles per hour.

An arcuate drift-angle scale 86 may be provided on the top face of the plate 55 in radial registration with the compass scale 68 of the disc 52, said scale being fixed and extending in both directions from a zero point thereof at the true point index 69 on the plate. The portions of the scale 86 at opposite sides of the index 69 are preferably differentiated as the portions of the scale 32 on the drift-indicating disc 31, it being noted that the instrument is set for a ten degree left drift in the drawings whereby the drift angle is read in the red zone of either or both of the scales 32 and 86. When the drift angle is known as to its magnitude and its direction with respect to the aircraft heading, either from a reading of the scale 32 provided by a setting of the rule 36 or from an independent source, and the compass rose is set with the heading bearing registering with the index 69, the scale 86 may be used to ascertain the track bearing simply by reading the bearing on the compass rose opposite the drift angle on the scale 86.

Noting that a drift setting of the rule 36 disposes its ruling or reference edge 36' in true drift angle relation (right or left) to the instrument reference line R, it will be understood that a line through the center of the disc 52 and parallel to the rule edge 36' will directly indicate the track bearing on the compass rose scale 68 which has been set for the heading. Accordingly, a means is preferably provided for indicating said track-bearing line in accordance with a sighted setting of the rule 36 and without necessity of making any bearing readings at the scales 32 and/or 86 and/or elsewhere; such a device avoids the inaccuracies involved in reading an angle on a scale (the scale 32 or another) at which it is originally indicated and then locating the corresponding angle on a second scale (the scale 86) for reference to a third scale (the scale 68).

A particularly simple and effective device for obtaining a direct reading of a bearing angle on the compass rose scale 68 with the present instrument is illustrated in Figures 1 and 13, and essentially comprises the utilizing of the rule 36 as an element of a parallel-ruler assembly. As shown, a straight-edge rule element 87 of uniform width has spaced points thereof so connected by mutually parallel links 88 of equal length with the rule 36 that either of its side edges may be disposed through the axis of the compass disc 52 and so indicate a track bearing on the scale 68 at the element edge of reference. In the present structure, the links 88 extend from pivot pins 89 connecting them to the rule 36 to pivot pins 90 connecting them to the rule 87. In order to permit the disposal of the rule 87 at either side of the rule 36, which may be disposed at either side of the line R, the links 88 overlie the rule 36 and the rule 87 overlies the links.

The rule and link assembly 88—87—88 may be removably mounted on the rule 36, and to that end the pivot pins 89 are fixed to the links and are removably engageable in suitably spaced socket holes 91 provided in the rule 36. As particularly shown, the socket holes 91 are provided in three pairs to provide for a selective mounting of the assembly 88—87—88 at different positions along the rule 36 whereby the rule 87 may be somewhat shorter than would otherwise be required and may be mounted on the positioned rule 36 where best usable in the described manner. As indicated, the rule member 87 and the connecting links 88 may be of transparent material to facilitate a viewing of the underlying calibrations where they overlie the rule 36 and disc 52.

Having either disclosed instrument assembly mounted on an aircraft with the reference line R parallel to the heading line of the aircraft, while the aircraft is in substantially level flight with a known compass bearing and at a known air speed, the instrument is readied for the making of navigational determinations therewith by setting the unit 53 in the appropriate air-speed setting on the base by use of the scale 81 and by setting the true (corrected) bearing reading for the aircraft on the compass disc 52 at the index 69; the order of making these settings is immaterial. In connection with true bearing settings, it will be noted that the disclosed arrangement makes the algebraic addition of a magnetic variation to the compass bearing at the point of observation particularly natural. To facilitate a setting for true bearings or reducing true bearings to magnetic bearings, printed directions setting forth the manner of applying east or west magnetic variations may be provided on the top face of the plate 55, separate instructions being provided for "magnetic-to-true" and "true-to-magnetic" at opposite sides of the reference line R. Alternatively, bearing settings and determinations may both be magnetic throughout in those cases where ascertained magnetic bearings are to be used at the point of their determination.

Having the instrument conditioned as described for a drift setting, a single setting of the drift angle rule 36 in a drift-indicating position permits a direct ground-track reading on the compass scale 68, either by use of the scale 85 or by appropriately setting the parallel rule 87 from the set rule 36. It will be understood that the scale 86 may be used for directly ascertaining the track bearing on the compass rose if the value of the drift angle is known, while the parallel rule 87 would preferably be used when the rule 36 is set by observation because a drift angle reading is not then needed.

It will now be noted that plural cooperative settings of the rule 36 in different drift angle positions with respect to the reference line R are required and utilized for determinations of ground speed and wind bearing and wind velocity with the present instrument, successive settings being made by varying the air speed and/or the bearing of the carrying aircraft, provided only that the air is moving at the same velocity and in the same direction over the earth's surface when associated settings are made. Thus, cooperative rule settings might be made with air speeds and bearings both changed, or with only one changed. If rule settings are made at the same air speed with different headings, the disc-carrying unit 53 need not be shifted for cooperative settings, and might even be non-adjustably fixed to the base if the disc axis B is disposed at an average aircraft velocity-vector distance from the drift-arm axis D. On the other hand, the same heading may be usable with different air speeds for all rule-setting operations of a series simply by resetting the unit 53 for different successive air speeds.

If, as may happen, the aircraft-supporting air should be motionless, the wind velocity and drift angle would, of course, be zero; if such is found to be the case, as by sight observations with the present instrument, further navigation determinations may be made without further reference to the instrument, since the ground speed and bearing are then the same as the air speed and heading respectively, since flying in the wind flow direction produces no drift. an observation with a different heading must be made to verify an apparent lack of air movement indicated by the first observation.

Having the unit 53 and disc 52 respectively set in appropriate air speed and true bearing positions therefor, the rule 36 is now set at the appropriate drift angle by observation in the previously described manner by sighting through the sight tube 22 of Figures 1 to 10, or sighting through the telescope 37 of Figures 11 and 12, and drawing a pencil line $a$ on the disc 52 along the ruling edge 36' of the rule. The air speed and/or bearing of the aircraft are then changed, the settings of the unit and/or disc are changed for conformity with the new value or values, a new setting of the rule 36 is made to indicate the new drift angle under the changed operating conditions, and a pencil line $c$ is drawn on the disc 52 for intersecting the line $a$ at a point P on the disc. It will be understood that further lines drawn along the rule for other substantially simultaneous air speed and/or bearing settings will intersect the lines $a$ and $c$ at the point P if the wind bearing and velocity are constant; thus check settings may be readily made. Furthermore, if three or more of the drawn lines should not be precisely concurrent because of slight variations in setting conditions, an "average" point P of concurrence may be readily located, since the various intersection points of the line pairs will be relatively close together. It will be understood that a point P is most accurately located if the lines $a$ and $c$ defining it intersect at greater than a forty-five degree angle.

Having found the intersection point P in the described manner. and with the rule 36 and disc 52 in one of their cooperative positions for the drawing of a line $a$ or $c$, the scale 85 of the rule 36 may be read opposite the point P to give a direct reading of the ground speed of the aircraft in the direction then indicated by the rule position; the disc is shown as positioned for drawing the line $c$ while the heading is zero. or North. The radial distance of the point P from the disc axis B represents the wind velocity, and the latter may be ascertained by measurement on the wind speed scale from the disc center by use of a dividers (not shown) or by rotating the disc 52 to dispose the point P opposite the line of the calibrated edge of the member 79 for a direct reading of the wind speed on the scale 78. The radial line through the point P also indicates the wind angle with respect to the aircraft heading whereby the point of intersection of this line with the compass calibrations 68 of the disc directly gives the correct wind bearing, or the correct wind bearing is indicated at the index point 69 when the disc has been turned for a direct reading of the wind velocity in the described manner.

By reference to Figure 1, it will be readily seen that a vector triangle D—P—B is directly defined on the instrument with any but a zero angle setting of the drift rule 36, Figure 1 showing such a triangle for a ten degree drift to the left, and said triangle disclosing a ground speed of about three hundred sixteen miles per hour on the rule scale. Referring the point P to the compass scale 68 and the wind speed scale 78, the wind bearing and velocity are respectively read as eighty-three degrees and fifty-five miles per hour. Said vector triangle D—P—B has been shown by itself as Figure 1a, with the triangle sides $d$ and $p$ and $b$ respectively opposite the apices D and P and B and comprising direct vector measures of the wind velocity and air speed and ground speed at their common scale. The interior angle of the triangle at D is the drift angle and the interior angle at B is the wind angle, both with respect to the reference line R with which the line $p$ coincides as the heading line. A line $b'$ extending forwardly from the point B in parallel relation to the line $b$ comprises the radial line from which the track bearing is directly read, said line having been made by the described use of the parallel rule 87. From a consideration of the relation of the elements of the vector triangle D—P—B to the disclosed setting of the instrument, the significance of all readings and determinations is self-evident, whereby the present instrument is particularly easy to use with surety and accuracy.

While both disclosed embodiments of the present instrument have, for descriptive convenience, been so far described as in use on an air-borne aircraft to determine the existing flight conditions, it is to be noted that the instrument may be used for making various determinations therewith when the aircraft is grounded or the instrument is not associated with an aircraft. Also, a navigator or flight director having the necessary data, may use the instrument to predetermine course and speed values in interception and return problems, either while aloft or while on the ground; thus, with wind speed and direction known as a means to locate a point P on the disc 52, going and return headings at predetermined or assumed speeds may be directly determined in advance and checked in flight, the ground speed scale 81 and air speed scale 85 being conveniently usable interchangeably to facilitate the making of directive determinations. The present instrument also has considerable value for teaching navigation principles by solving imaginary navigation problems which involve wind drift, the arrangement of the present instrument being such that it may be used for instruction purposes with confidence and full understanding.

In view of the foregoing, it will be understood that the present instrument is arranged for use to ascertain actual flight conditions as a basis for dead-reckoning navigational determinations therewith of the proper heading toward a given point at a given air speed. It will also be noted that the use of the present device for ascertaining ground speeds of a moving aircraft by observation of a ground point is independent of the altitude and/or time factors which must be considered under previous known methods of determining ground speed of an aircraft from the aircraft. Since all determinations made with the present instrument are direct, and do not require mathematical computations or a re-application of readings or altitude determinations or time measurements, the present dead-reckoning navigation method and means are particularly simple and accurate.

Considering the present instruments as mechanical structures, it will be noted that all elements thereof may, if desired, be made of non-metallic materials, particularly if suitable metallic materials for making those elements which might be of metal are scarce or unavailable; all but the transparent elements might be of metal, while the transparent elements would preferably be made of a plastic which is not brittle. Whatever metallic elements are utilized would preferably be of non-magnetic materials for avoiding any possible effect on compasses or other magnetic devices in the vicinity of an installed instrument.

From the foregoing description, taken in connection with the accompanying drawings, the advantages of the construction and use of the present dead-reckoning instrument will be readily understood by those skilled in the art to which the invention appertains. While I have described the features and use of illustrated arrangements which I now consider to be preferred embodiments of my invention, I desire to have it understood that the disclosures are primarily illustrative, and that such changes and developments may be made, when desired, as fall within the scope of the following claims,

I claim:

1. In an aerial navigation instrument, a base member providing a straight reference line and arranged for fixed disposal on an aircraft with said reference line in predetermined angular relation to the heading line of the aircraft, a downwardly directed sight tube carried by said base member and having its line of sight intersecting said reference line of the base and providing a reference cross-line in its line of sight, means swiveling said sight tube on the base for rotative adjustment about its sight axis to set its cross-line in coplanar relation with the track line of the moving aircraft over a relatively fixed object beneath the aircraft during observation of the object through the sight tube, a rotatively adjustable compass rose mounted on said base with its axis of rotation intersecting said reference line of the base, and an arm fixedly carried by said tube and providing a straight edge extending radially from the tube axis for cooperation with said compass rose for providing navigation data utilizing a said setting of the cross-line of the tube.

2. In an aerial navigation instrument, a base member providing a straight reference line and arranged for fixed disposal on an aircraft with said reference line in predetermined angular relation to the heading line of the aircraft, a plotting disc mounted on said base for rotative adjustment about an upright axis intersecting the reference line and providing a compass rose referred to an index point in said reference line, an arm providing a straight ruling edge extending radially from an upright axis intersecting said reference line and arranged for setting to define the drift angle of the aircraft with respect to said reference line while extending over the disc, means on the base for use to set the arm in drift-indicating position by direct observation of a relatively fixed terrestrial point, and means carried on the arm for defining a radial line through the disc axis in parallel relation to the ruling edge of the set arm for indicating the track bearing on the compass rose.

3. In an aerial navigation instrument, a base member providing a straight reference line and arranged for fixed disposal on an aircraft, a plotting disc mounted on said base for rotative adjustment about an upright axis intersecting the reference line and providing a compass rose referred to an index point in fixed relation to its axis, an arm providing a straight ruling edge extending radially from an upright axis intersecting said reference line and arranged for setting to define the drift angle of the aircraft with respect to said reference line while extending over the disc, and means carried on the arm for defining a radial line through the disc axis in parallel relation to the ruling edge of the set arm for indicating the track bearing on the compass rose.

EMMETT T. MOLAMPHY.

REFERENCES CITED

The following references are of record in the file of this patent:

UNITED STATES PATENTS

| Number | Name | Date |
|---|---|---|
| 944,437 | Hill | Dec. 28, 1909 |
| 1,664,454 | Hunt et al. | Apr. 3, 1928 |
| 1,784,929 | Estoppey | Dec. 16, 1930 |
| 1,910,093 | Colvin | May 23, 1933 |
| 1,919,126 | Perkins | July 18, 1933 |
| 1,969,939 | Nelson | Aug. 14, 1934 |
| 2,296,692 | Thurston | Sept. 22, 1942 |
| 2,339,222 | Hokanson | Jan. 11, 1944 |

FOREIGN PATENTS

| Number | Country | Date |
|---|---|---|
| 153,989 | Great Britain | 1920 |